United States Patent
Matsui et al.

(10) Patent No.: US 11,782,219 B2
(45) Date of Patent: Oct. 10, 2023

(54) OPTICAL SWITCH

(71) Applicant: KYOCERA Corporation, Kyoto (JP)

(72) Inventors: Naoki Matsui, Tokyo (JP); Tomoya Sugita, Machida (JP); Hiromichi Yoshikawa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 83 days.

(21) Appl. No.: 17/297,113

(22) PCT Filed: Nov. 5, 2019

(86) PCT No.: PCT/JP2019/043330
§ 371 (c)(1),
(2) Date: May 26, 2021

(87) PCT Pub. No.: WO2020/110628
PCT Pub. Date: Jun. 4, 2020

(65) Prior Publication Data
US 2021/0396934 A1 Dec. 23, 2021

(30) Foreign Application Priority Data
Nov. 28, 2018 (JP) ................ 2018-222732

(51) Int. Cl.
*G02B 6/35* (2006.01)
(52) U.S. Cl.
CPC ......... *G02B 6/3546* (2013.01); *G02B 6/3502* (2013.01)
(58) Field of Classification Search
CPC ....... G02B 6/35; G02B 6/3502; G02B 6/3546
See application file for complete search history.

(56) References Cited

U.S. PATENT DOCUMENTS

| 5,002,354 A | 3/1991 | Koai |
| 7,145,660 B2 | 12/2006 | Margalit et al. |
| 7,269,305 B2 | 9/2007 | Tsuda et al. |
| (Continued) | | |

FOREIGN PATENT DOCUMENTS

| JP | 2005-077943 A | 3/2005 |
| JP | 2006-184345 A | 7/2006 |
| (Continued) | | |

*Primary Examiner* — Tina M Wong
(74) *Attorney, Agent, or Firm* — Studebaker & Brackett PC

(57) ABSTRACT

The optical switch 10 comprises a first waveguide 11, a second waveguide 12, and an exchanger 13. The first waveguide 11 comprises a first end E1 and a second end E2. The second waveguide 12 comprises a third end E3 and a fourth end E4, respectively located on the first end E1 side and the second end E2 side as viewed from the center of the first waveguide 11. The exchanger 13 comprises: a first waveguide section 21 configuring a directional coupler together with the first waveguide 11 and including a phase changing material 23; and a second waveguide section 22 configuring a directional coupler together with the second waveguide 12 and including a phase change material 24. The exchanger 13 inputs electromagnetic waves, input from the first end E1 and output from the first waveguide section 21, to the third end E3 side of the second waveguide section 22. The exchanger 13 inputs electromagnetic waves, input from the third end E3 and output from the second waveguide section 22, to the second end E2 side of the first waveguide section 21.

7 Claims, 4 Drawing Sheets

(56) References Cited

U.S. PATENT DOCUMENTS

2012/0081197 A1    4/2012  Park et al.
2016/0140535 A1*  5/2016  Noe ..................... G06Q 20/326
                                                            705/39
2017/0250336 A1    8/2017  Tanimoto et al.

FOREIGN PATENT DOCUMENTS

| JP | 2008-262478 A | 10/2008 |
| JP | 5083732 B2 | 11/2012 |
| WO | 2016002604 A1 | 1/2016 |

* cited by examiner

OPTICAL SWITCH

CROSS REFERENCE TO RELATED APPLICATION

This application claims the priority of Patent Application 2018-222732 filed in Japan on Nov. 28, 2018, and the entire disclosure of this previous application is hereby incorporated for reference.

TECHNICAL FIELD

The present disclosure relates to an optical switch.

BACKGROUND

Optical switches based on silicon photonics are required to be miniaturized to shorten the propagation length in order to reduce insertion loss. PLT 1 discloses an optical switch whose size can be miniaturized by using a phase change material provided along the core.

CITATION LIST

Patent Literature

PLT 1: JP2006184345A

SUMMARY

An optical switch according to the first aspect comprises.

a first waveguide comprising a first end and a second end which are ports electromagnetic waves are input to and output from, and a second waveguide comprising a third end and a fourth end which are ports electromagnetic waves are input to and output from, wherein the third end and the fourth end are located on the first end side and the second end side, respectively, viewed from the center of the first waveguide, and an exchanger comprising: at least one first waveguide section, located along the first waveguide, configuring a directional coupler together with the first waveguide, and including a phase change material; and at least one second waveguide section, located along the second waveguide, configuring a directional coupler together with the second waveguide, and including a phase change material, wherein: the exchanger inputs electromagnetic waves, input from the first end and output from any of the first waveguide sections, to the third end side of any of the second waveguide sections; and the exchanger inputs electromagnetic waves, input from the third end and output from any of the second waveguide sections, to the second end side of any of the first waveguide sections.

DETAILED DESCRIPTION

Hereinafter, embodiments of an optical switch to which the present disclosure is applied will be described with reference to the drawings.

Figure 1:
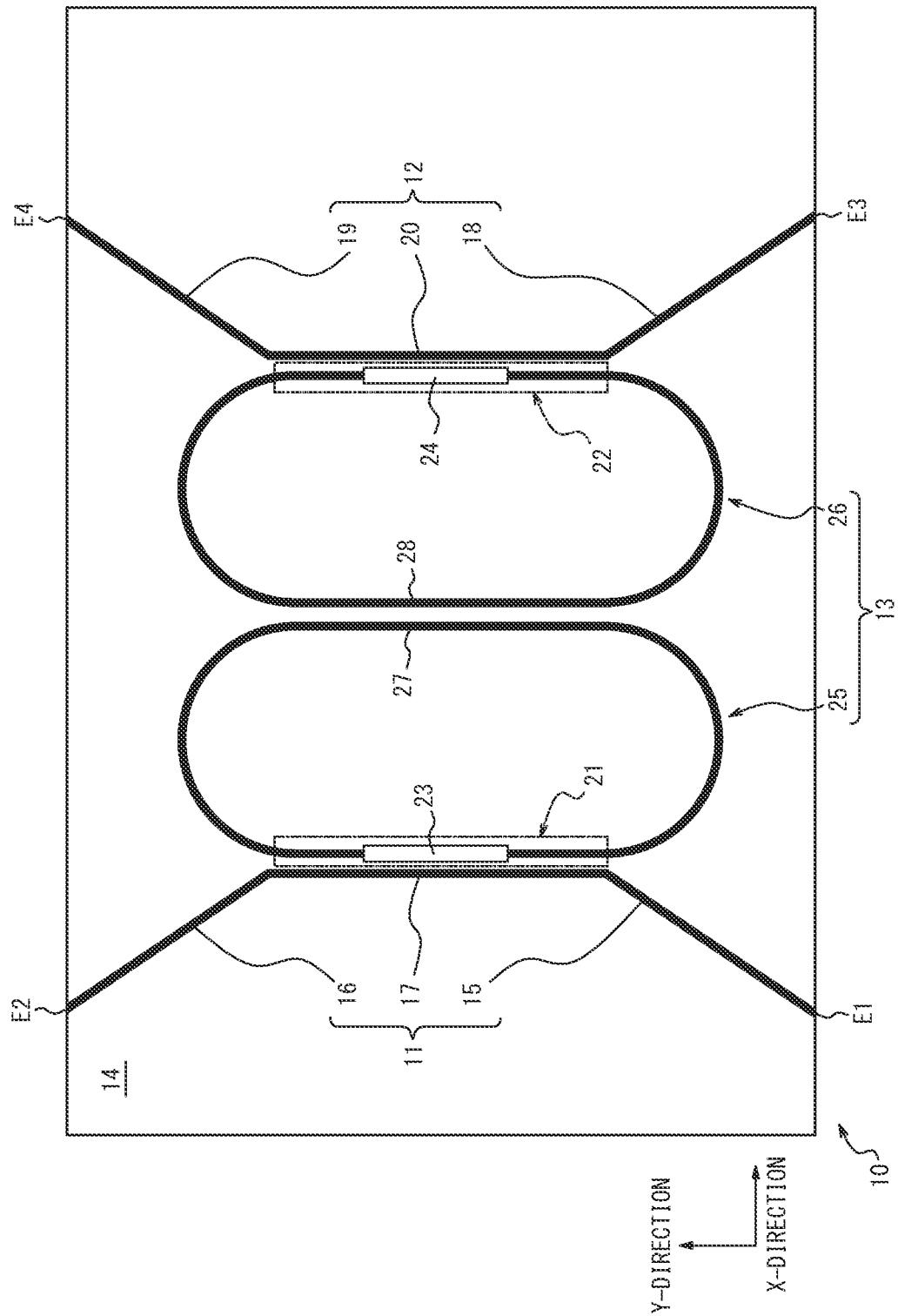
FIG. 1 shows a top view diagram of an optical switch according to the first embodiment.

As shown in FIG. 1, an optical switch 10 according to the first embodiment of the present disclosure is configured to include a first waveguide 11, a second waveguide 12, and an exchanger 13. The first waveguide 11, the second waveguide 12, and the exchanger 13 are provided on, for example, a substrate 14. At least, the first waveguide 11 and the second waveguide 12 may be located on the same plane on the substrate 14.

The substrate 14 may be made of, for example, a conductor such as metal, a semiconductor such as silicon, glass, or resin. In the present embodiment, any two directions perpendicular to each other on the substrate 14 are defined as x-direction and y-direction.

The first waveguide 11 includes, for example, a first end section 15, a second end section 16, and a first linear section 17. The first linear section 17 is a linear section extending in the y-direction. The first linear section 17 connects to the first end section 15 at the opposite side end in the y-direction. The first linear section 17 is connected to the second end section 16 at the end in the y-direction side. The end of the first end section 15 on the opposite side in the y-direction is the first end E1, which is one end of the entire first waveguide 11. The end of the second end section 16 on the y-direction side is the second end E2, which is the other end of the entire first waveguide 11. The first end E1 and the second end E2 are ports where electromagnetic waves are input and output.

The second waveguide 12 includes, for example, a third end section 18, a fourth end section 19, and a second linear section 20. The second linear section 20 is a linear section extending in the y-direction. The second linear section 20 connects to the third end section 18 at the opposite side end in the y-direction. The second linear section 20 is connected to the fourth end section 19 at the end on the y-direction side. The end of the third end section 18 on the opposite side in the y-direction is the third end E3, which is one end of the entire second waveguide 12. The end of the fourth end section 19 on the y-direction side is the fourth end E4, which is one end of the entire second waveguide 12. Therefore, the third end E3 is located on the first end E1 side viewed from the center in the longitudinal direction of the first waveguide 11. Further, the fourth end E4 is located at the second end E2 side viewed from the center in the longitudinal direction of the first waveguide 11. The third end E3 and the fourth end E4 are ports where electromagnetic waves are input and output.

The exchanger 13 comprises at least one first waveguide section 21 and at least one second waveguide section 22.

The first waveguide section 21 is located along the first waveguide 11. The first waveguide section 21 configures a 2×2 directional coupler together with the first waveguide 11. The first waveguide section 21 comprises a first phase change material 23. The first waveguide section 21 may include a linear section extending in the y-direction.

The second waveguide section 22 is located along the second waveguide 12. The second waveguide section 22 configures a 2×2 directional coupler together with the second waveguide 12. The second waveguide section 22 includes a second phase change material 24. The second waveguide section 22 may include a linear section extending in the y-direction.

The first waveguide 11, the second waveguide 12, the first waveguide section 21, and the second waveguide section 22 are composed of a core and a clad. The cores of the first waveguide 11, the second waveguide 12, the first waveguide section 21, and the second waveguide section 22 may be made of the same dielectric material to propagate electromagnetic waves such as silicon. Further, the clad may be made of a dielectric with a smaller refractive index than the core, such as quartz glass.

At least a part of the first linear section 17 is opposing to at least a part of the linear section of the first waveguide section 21. The length of the opposing part may be the coupling length in the state where the first phase change material 23 is changed to the amorphous phase. The coupling length is the length from the starting point of the opposing part to the position where the coupling coefficient reaches its maximum value. The coupling coefficient is a parameter indicating the ratio of electromagnetic waves to be transferred from one waveguide to the other in a parallel waveguide in which two linear waveguides are lined up. In a configuration where no electromagnetic waves are transferred at all from one waveguide to the other, the coupling coefficient is zero. In a configuration where all electromagnetic waves are transferred from one waveguide to the other, the coupling coefficient is 1. The coupling coefficient is included in the range between 0 and 1. The coupling coefficient is determined based on the shape of each waveguide, the distance between each waveguide, or the length of the waveguides opposing to each other.

At least a part of the second linear section 20 are opposing to at least a part of the linear section of the second waveguide section 22. The length of the opposing part may be the coupling length in the state where the second phase change material 24 is changed to the amorphous phase.

The first phase change material 23 and the second phase change material 24 may be displaced from that same plane in a direction perpendicular to the same plane in which the first waveguide 11 and the second waveguide 12 are located. For example, the first phase change material 23 and the second phase change material 24 may each be located on the opposite side of the first waveguide section 21 and the second waveguide section 22 from the substrate 14 in a direction perpendicular to the main surface of the substrate 14, that is, the widest surface of the substrate 14.

The first phase change material 23 and the second phase change material 24 can be phase-changed to an amorphous or a crystalline phase. The first phase change material 23 and the second phase change material 24 may be phase-changed by laser beam emitted from a laser source or by heat generation by a resistive element.

When the first phase change material 23 is an amorphous phase, loss of electromagnetic waves in the first waveguide section 21 is relatively small. Therefore, in this case, because the effective refractive indices of the first linear section 17 and the first waveguide section 21 are substantially the same and the length is also the coupling length, electromagnetic waves input from the first end E1 side of the first linear section 17 and the first waveguide section 21 are respectively output from the second end E2 side of the first waveguide section 21 and the first linear section 17. Similarly, when the second phase change material 24 is an amorphous phase, electromagnetic waves input from the third end E3 side of the second linear section 20 and the second waveguide section 22 are respectively output from the fourth end E4 side of the second waveguide section 22 and the second linear section 20.

When the first phase change material 23 is a crystalline phase, the loss of electromagnetic waves in the first waveguide section 21 is relatively large. Therefore, in this case, because the effective refractive indices of the first linear section 17 and the first waveguide section 21 are significantly different, the electromagnetic waves input from the first end E1 side of the first linear section 17 are not transferred to the first waveguide section 21, in other words, the electromagnetic waves are output from the second end E2 side of the first linear section 17 without propagating through the lossy first waveguide section 21. Similarly, if the second phase change material 24 is a crystalline phase, electromagnetic waves input from the third end E3 side of the second linear section 20 are not transferred to the second waveguide section 22, but are output from the fourth end E4 side of the second linear section 20.

For the first phase change material 23 and the second phase change material 24, for example, tetrahedral materials such as amorphous silicon, amorphous germanium, amorphous gallium antimony, amorphous gallium arsenide, amorphous indium selenide, amorphous gallium selenide, Ge—Sb—Te chalcogenide materials such as $Ge_2Sb_2Te_5$ and $Ge_6Sb_2Te_9$, Sb—Te chalcogenide materials, or chalcogenide materials such as $As_2Se_3$, $As_2S_3$, are used.

The exchanger 13 inputs electromagnetic waves, input from the first end E1 of the first waveguide 11 and output from any of the first waveguide sections 21 through a directional coupler, to the third end E3 side of any of the second waveguide sections 22. The exchanger 13 inputs electromagnetic waves, input from the third end E3 of the second waveguide 12 and output from any of the second waveguide sections 22 through a directional coupler, to the first end E1 side of any of the first waveguide sections 21.

The first waveguide 11, the second waveguide 12, and the exchanger 13 may satisfy the waveguiding condition in single mode. Therefore, electromagnetic waves, input to at least one of the first end E1 and the third end E3, may be propagated in single mode.

The detailed configuration of the exchanger 13, as described above in the first embodiment, will be described below.

In the first embodiment, the exchanger 13 comprises an annular third waveguide 25 and an annular fourth waveguide 26. The third waveguide 25 and the fourth waveguide 26 are located, for example, between the first waveguide 11 and the second waveguide 12. The third waveguide 25 and the fourth waveguide 26 are arranged to line up along the x-direction, for example.

The third waveguide 25 is annular including the first waveguide section 21 as a part. The third waveguide 25 has a linear first section 27 extending in the y-direction on the opposite side of the first waveguide section 21 in the x-direction.

The fourth waveguide 26 is annular including the second waveguide section 22 as a part. The fourth waveguide 26 has a linear second section 28 extending in the y-direction on the opposite side of the second waveguide section 22 in the x-direction. The second section 28, that is a part of the fourth waveguide 26, is opposing to the first section 27, that is a part of the third waveguide 25, and configures a 2×2 directional coupler. The length of the first section 27 and the second section 28 is the coupling length. Therefore, the electromagnetic waves, respectively input to the first section 27 and the second section 28, can be output from the second section 28 and the first section 27 at a higher intensity than the other sections.

The optical switch 10 of the first embodiment, configured as described above, comprises: at least one first waveguide section 21 configuring a directional coupler together with the first waveguide 11 and including a first phase change material 23; at least one second waveguide section 22 configuring a directional coupler together with a second waveguide 12 and including a second phase change material 24; and an exchanger 13, configured to: input electromagnetic waves, input from the first end E1 and output from any of the first waveguide sections 21, to the third end E3 side of any of the second waveguide sections 22; and to input electromagnetic waves, input from the third end E3 and output from any of the second waveguide sections 22, to the second end E2 side of any of the first waveguide sections 21. In such a configuration, when the phase of the first phase change material 23 and the second phase change material 24 is changed to a crystalline phase, the optical switch 10 can cause electromagnetic waves, input to the first end E1 and the third end E3, to respectively output from the second end E2 and the fourth end E4 without causing them to propagate through the first waveguide section 21 and the second waveguide section 22. Further, when the phase of the first phase change material 23 and the second phase change material 24 are changed to an amorphous phase, the optical switch 10 can cause electromagnetic waves, input to the first end E1 and the third end E3, to propagate through the first waveguide section 21 and the second waveguide section 22 in a state where the loss is relatively small, and to respectively output from the fourth end E4 and the second end E2. Therefore, in the crystal phases of the first phase change material 23 and the second phase change material 24 that relatively increase loss of electromagnetic waves in the first waveguide section 21 and the second waveguide section 22, the optical switch 10 can switch the output destination of the electromagnetic waves without causing the electromagnetic waves to propagate through the first waveguide section 21 and the second waveguide section 22. Therefore, the optical switch 10 can reduce insertion loss while using the first phase change material 23 and the second phase change material 24.

Further, in the optical switch 10 of the first embodiment, electromagnetic waves, input to at least one of the first end E1 and the third end E3, are propagated in single mode. With such a configuration, the optical switch 10 can be suitably used for optical communications because the waveform of the propagating signal is less likely to be collapsed.

Further, in the optical switch 10 of the first embodiment, the first waveguide 11 and the second waveguide 12 are located on the same plane. In a configuration in which the same material is applied to the first waveguide 11 and the second waveguide 12, based on the above configuration, the optical switch 10 can be easily produced on the substrate 14 as compared to the configuration in which both are displaced in the direction perpendicular to the main surface.

In the optical switch 10 of the first embodiment, the first phase change material 23 and the second phase change material 24 are displaced from the same plane, in which the first waveguide 11 and the second waveguide 12 are located, in a direction perpendicular to the same plane. With such a configuration, the optical switch 10 can form the first phase change material 23 and the second phase change material 24 in separate layers after forming the waveguides configurating the first waveguide 11, the second waveguide 12, and the exchanger 13. The waveguides configuring the first waveguide 11, the second waveguide 12, and the exchanger 13 can be made of the same material but different from the first phase change material 23 and second phase change material 24. Therefore, the optical switch 10, configured as described above, can be easily produced by such a production method that layers are formed for each of the same materials.

Next, the optical switch according to the second embodiment of the present disclosure will be described. In the second embodiment, the configuration of the exchanger is different from that in the first embodiment. The second embodiment will be described below, focusing on the different points from the first embodiment. It is noted that the same reference signs are given to the parts with the same configuration as that in the first embodiment.

Figure 2:
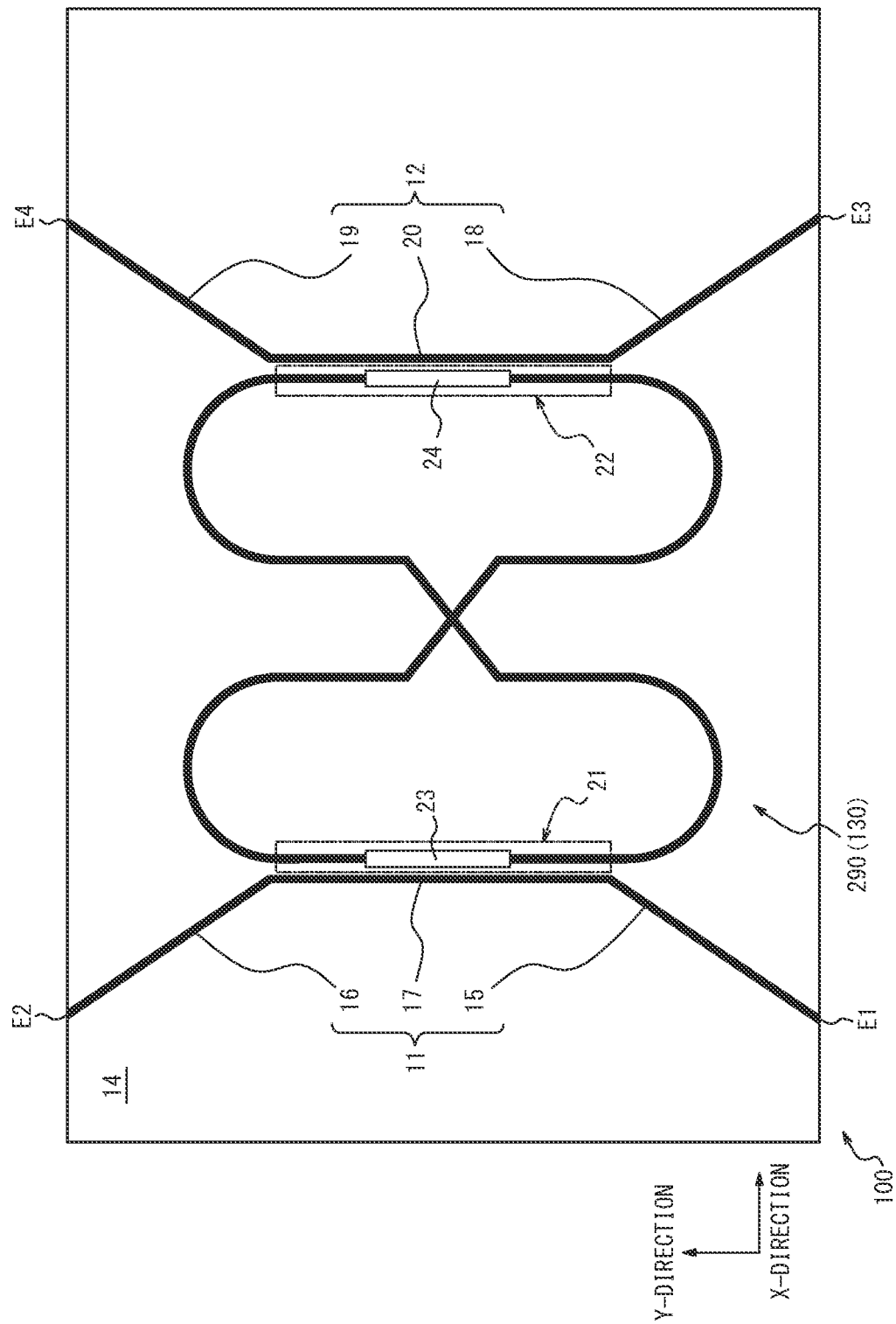
FIG. 2 shows a top view diagram of an optical switch according to the second embodiment.

As shown in FIG. 2, the optical switch 100 according to the second embodiment is similar to that of the first embodiment and is configured to include a first waveguide 11, a second waveguide 12, and an exchanger 130. In the second embodiment, the configuration and function of the first waveguide 11 and the second waveguide 12 are the same as those in the first embodiment.

The exchanger 130 comprises at least one first waveguide section 21 and at least one second waveguide section 22, as in the first embodiment. The configuration and function of the first waveguide section 21 and the second waveguide section 22 are the same as those in the first embodiment.

As in the first embodiment, the exchanger 130 inputs electromagnetic waves, input from the first end E1 of the first waveguide 11 and output from any of the first waveguide sections 21 through a directional coupler, to the third end E3 side of any of the second waveguide sections 22. As in the first embodiment, the exchanger 130 inputs electromagnetic waves, input from the third end E3 of the second waveguide 12 and output from any of the second waveguide sections 22 through a directional coupler, to the first end E1 side of any of the first waveguide sections 21.

The detailed configuration of the exchanger 130 as described above in the second embodiment will be described below.

In the second embodiment, the exchanger 130 comprises an annular fifth waveguide 290. The fifth waveguide 290 is located, for example, between the first waveguide 11 and the second waveguide 12. The fifth waveguide 290 is annular, including a first waveguide section 21 and a second waveguide section 22 as a part.

In the fifth waveguide 290, the second end E2 side of the first waveguide section 21 is connected to the third end E3 side of the second waveguide section 22 Further, in the fifth waveguide 290, the fourth end E4 side of the second waveguide section 22 is connected to the first end E1 side of the first waveguide section 21. The fifth waveguide 290 has, for example, a shape in which an annulus is twisted by 180 degrees.

In the fifth waveguide 290, a part of the linear section connecting the second end E2 side of the first waveguide section 21 to the third end E3 side of the second waveguide section 22 and a part of the linear section connecting the fourth end E4 side of the second waveguide section 22 to the first end E1 side of the first waveguide section 21 may be vertical.

Furthermore, a part of the linear section connecting the second end E2 side of the first waveguide section 21 to the third end E3 side of the second waveguide section 22 and a part of the linear section connecting the fourth end E4 side of the second waveguide section 22 to the first end E1 side of the first waveguide section 21 may intersect, or be displaced in a direction perpendicular to the main surface of the substrate 14.

As in the first embodiment, the optical switch 100 of the second embodiment, configured as described above, comprises: at least one first waveguide section 21 configuring a directional coupler together with the first waveguide 11 and including a first phase change material 23; at least one second waveguide section 22 configuring a directional coupler together with the second waveguide 12 and including a second phase change material 24; and an exchanger 130, configured to: input electromagnetic waves, input from the first end E1 and output from any of the first waveguide sections 21, to the third end E3 side of any of the second waveguide sections 22; and to input electromagnetic waves, input from the third end E3 and output from any of the second waveguide sections 22, to the second end E2 side of any of the first waveguide sections 21. Therefore, the optical switch 100 of the second embodiment can also reduce insertion loss while using the first phase change material 23 and the second phase change material 24. Further, in the optical switch 100 of the second embodiment, as in the first embodiment, electromagnetic waves, input to at least one of the first end E1 and the third end E3, is propagated in single mode. Therefore, the optical switch 100 of the second embodiment can also be suitably used for optical communications because the waveform of the propagating signal is less likely to be collapsed. Further, in the optical switch 100 of the second embodiment, as in the first embodiment, the first waveguide 11 and the second waveguide 12 are located on the same plane. In a configuration in which the same material is applied to the first waveguide 11 and the second waveguide 12, thanks to the configuration described above, the optical switch 100 of the second embodiment can also be easily produced on the substrate 14 as compared to a configuration in which both are displaced in a direction perpendicular to the main plane.

In the optical switch 100 of the second embodiment, as in the first embodiment, the first phase change material 23 and the second phase change material 24 are displaced from the same plane, in which the first waveguide 11 and the second waveguide 12 are located, in a direction perpendicular to the same plane. Therefore, the optical switch 100 of the second embodiment can also be easily produced by the production method to form a layer for each of the same material.

Further, in the optical switch 100 of the second embodiment, a part of the linear section connecting the second end E2 side of the first waveguide section 21 to the third end E3 side of the second waveguide section 22 and a part of the linear section connecting the fourth end E4 side of the second waveguide section 22 to the first end E1 side of the first waveguide section 21 are vertical.
With such a configuration, the optical switch 100 can minimize that electromagnetic waves, propagating through a part of the linear section connecting the second end E2 side of the first waveguide section 21 to the third end E3 side of the second waveguide section 22, transfer to a part of the linear section connecting the fourth end E4 side of the second waveguide section 22 to the first end E1 side of the first waveguide section 21.

Next, the optical switch according to the third embodiment of the present disclosure will be described. In the third embodiment, the configuration of the exchanger is different from that in the first embodiment. The third embodiment will be described below, focusing on the different points from the first embodiment. It is noted that the same reference signs are given to the parts with the same configuration as that in the first embodiment.

Figure 3:
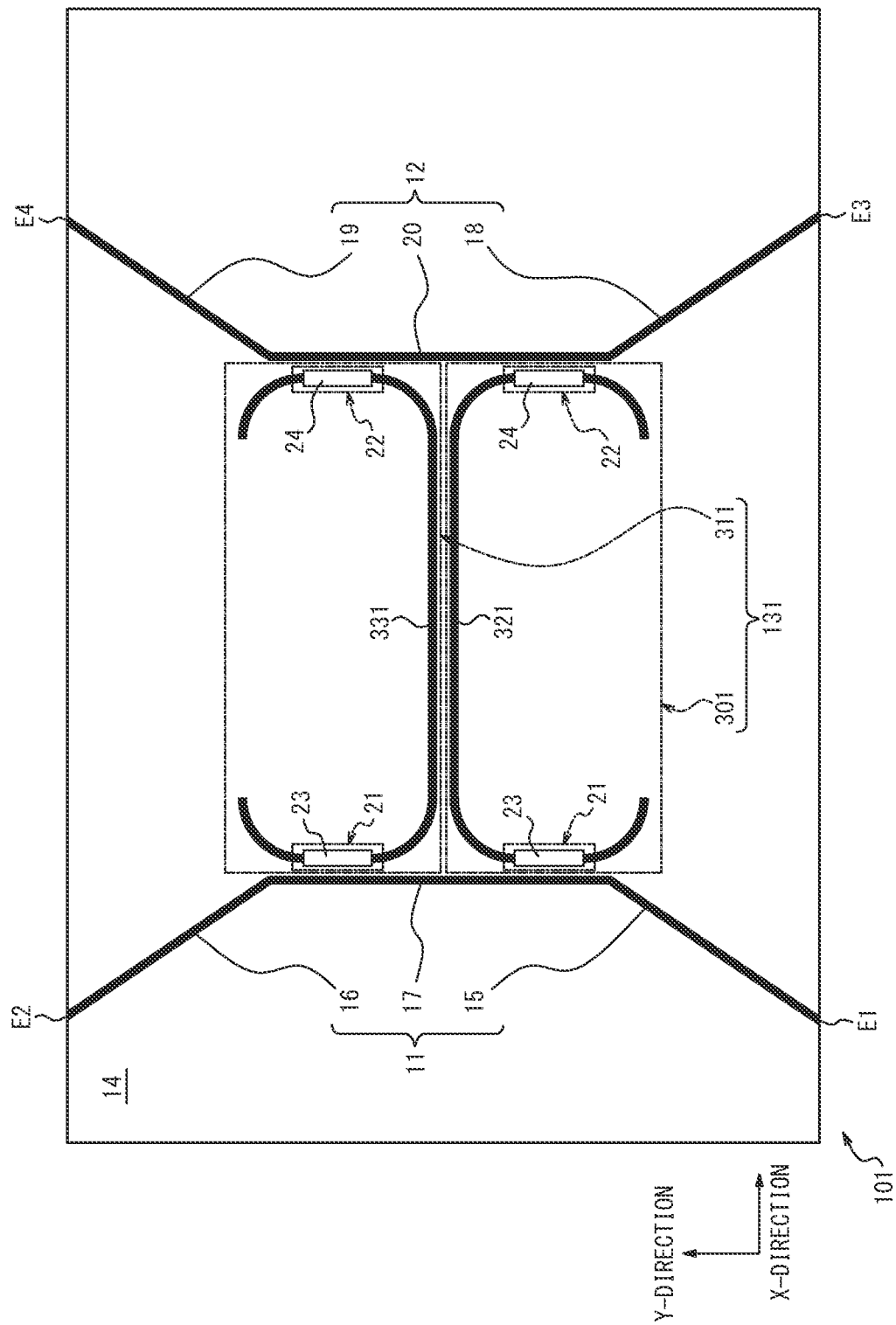
FIG. 3 shows a top view diagram of an optical switch according to the third embodiment.

As shown in FIG. 3, the optical switch 101 according to the third embodiment is similar to the first embodiment and is configured to include the first waveguide 11, the second waveguide 12, and the exchanger 131. In the third embodiment, the configuration and function of the first waveguide 11 and the second waveguide 12 are the same as those in the first embodiment.

The exchanger 131 comprises at least one first waveguide section 21 and at least one second waveguide section 22, as in the first embodiment. The configuration and function of the first waveguide section 21 and the second waveguide section 22 are the same as those in the first embodiment.

As in the first embodiment, the exchanger 131 inputs electromagnetic waves, input from the first end E1 of the first waveguide 11 and output from any of the first waveguide sections 21 through a directional coupler, to the third end E3 side of any of the second waveguide sections 22. Further, as in the first embodiment, the exchanger 131 inputs electromagnetic waves, input from the third end E3 of the second waveguide 12 and output from any of the second waveguide sections 22 through a directional coupler, to the first end E1 side of any of the first waveguide sections 21.

The detailed configuration of the exchanger 131 as described above in the third embodiment will be described below.

In the third embodiment, the exchanger 131 comprises a sixth waveguide 301 and a seventh waveguide 311. The sixth waveguide 301 and the seventh waveguide 311 are located, for example, between the first waveguide 11 and the second waveguide 12 Further, the sixth waveguide 301 and the seventh waveguide 311 are arranged so as to be arranged along the y-direction. The sixth waveguide 301 is located on the opposite side in the y-direction, that is, on the first end E1 side or the third end E3 side. Further, the seventh waveguide 311 is located on the y-direction side, that is, on the second end E2 side or the fourth end E4 side.

The exchanger 131 comprises two first waveguide sections 21 and two second waveguide sections 22.

The sixth waveguide 301 comprises a first waveguide section 21 on the first end E1 side and a second waveguide section 22 on the third end E3 side. In the sixth waveguide 301, the second end E2 side of the first waveguide section 21 on the first end E1 side is connected to the fourth end E4 side of the second waveguide section 22 on the third end E3 side. The sixth waveguide 301 comprises a linear third section 321 extending in the x-direction between the first waveguide section 21 and the second waveguide section 22.

The seventh waveguide 311 comprises a first waveguide section 21 on the second end E2 side and a second waveguide section 22 on the fourth end E4 side. In the seventh waveguide 311, the first end E1 side of the first waveguide section 21 on the second end E2 side is connected to the second end E2 side of the second waveguide section 22 on the fourth end E4 side. The seventh waveguide 311 comprises a linear fourth section 331 extending in the x-direction between the first waveguide section 21 and the second waveguide section 22. The fourth section 331, that is a part of the seventh waveguide 311, is opposing to the third section 321, that is a part of the sixth waveguide 301, and configures a 2×2 directional coupler. The length of the third section 321 and the fourth section 331 is the coupling length. Therefore, the electromagnetic waves, respectively input to the third section 321 and the fourth section 331, can be output from the fourth section 331 and the third section 321 at higher intensity than the other sections.

As in the first embodiment, the optical switch 101 of the third embodiment, configured as described above, comprises: at least one first waveguide section 21 configuring a directional coupler together with the first waveguide 11 and including a first phase change material 23; at least one second waveguide section 22 configuring a directional coupler together with the second waveguide 12 and including a second phase change material 24, and an exchanger 131, configured: to input electromagnetic waves, input from the first end E1 and output from any of the first waveguide sections 21, to the third end E3 side of any of the second waveguide sections 22; and to input electromagnetic waves, input from the third end E3 and output from any of the second waveguide sections 22, to the second end E2 side of any of the first waveguide sections 21. Therefore, the optical switch 101 of the third embodiment can also reduce insertion loss while using the first phase change material 23 and the second phase change material 24. Further, in the optical switch 101 of the third embodiment, as in the first embodiment, the electromagnetic waves, input to at least one of the first end E1 and the third end E3, is propagated in single mode. Therefore, the optical switch 101 of the third embodiment can also be suitably used for optical communications because the waveform of the propagating signal is less likely to be collapsed. Further, in the optical switch 101 of the third embodiment, as in the first embodiment, the first waveguide 11 and the second waveguide 12 are located on the same plane. In a configuration in which the same material is applied to the first waveguide 11 and the second waveguide 12, thanks to the configuration described above, the optical switch 101 of the third embodiment can also be easily produced on the substrate 14 as compared to a configuration in which both are displaced in a direction perpendicular to the main plane. Further, in the optical switch 101 of the third embodiment, as in the first embodiment,
the first phase change material 23 and the second phase change material 24 are displaced from the same plane, in which the first waveguide 11 and the second waveguide 12 are located, in a direction perpendicular to the same plane. Therefore, the optical switch 101 of the third embodiment can also be easily produced by the production method to form a layer for each of the same material.

Next, the optical switch according to the fourth embodiment of the present disclosure will be described. In the fourth embodiment, the configuration of the exchanger is different from that in the first embodiment. Hereinafter, the fourth embodiment will be described below, focusing on the different points from the first embodiment. It is noted that the same reference signs are given to the parts with the same configuration as that in the first embodiment.

Figure 4:
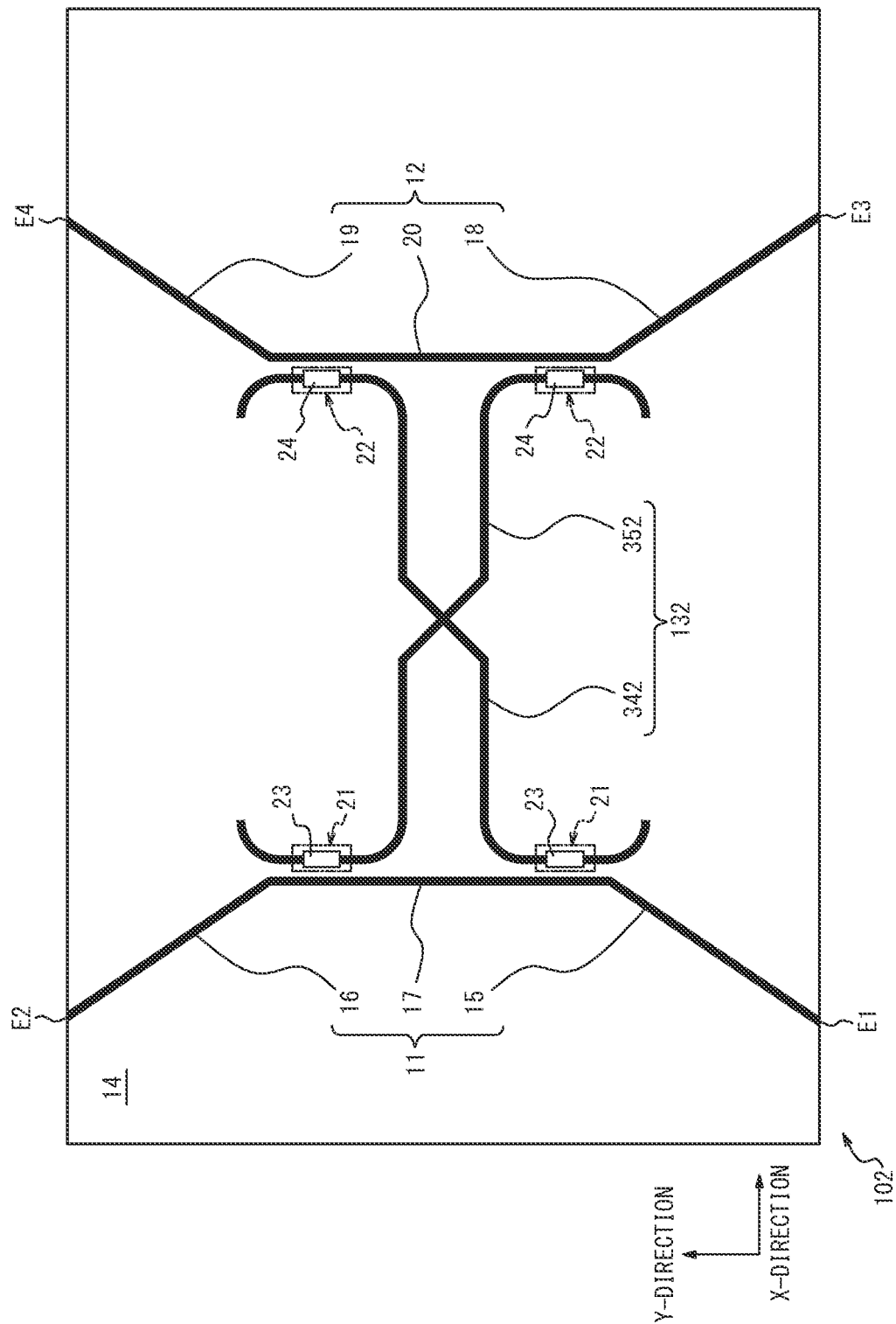
FIG. 4 shows a top view diagram of an optical switch according to the fourth embodiment.

As shown in FIG. 4, the optical switch 102 according to the fourth embodiment is similar to the first embodiment and is configured to include the first waveguide 11, the second waveguide 12, and the exchanger 132. In the fourth embodiment, the configuration and function of the first waveguide 11 and the second waveguide 12 are the same as those in the first embodiment.

The exchanger 132 comprises at least one first waveguide section 21 and at least one second waveguide section 22, as in the first embodiment. The configuration and function of the first waveguide section 21 and the second waveguide section 22 are the same as those in the first embodiment.

As in the first embodiment, the exchanger 132 inputs electromagnetic waves, input from the first end E1 of the first waveguide 11 and output from any of the first waveguide sections 21 through a directional coupler, to the third end E3 side of any of the second waveguide sections 22. Further, as in the first embodiment, the exchanger 132 inputs electromagnetic waves, input from the third end E3 of the second waveguide 12 and output from any of the second waveguide sections 22 through a directional coupler, to the first end E1 side of any of the first waveguide sections 21.

The detailed configuration of the exchanger 132 as described above in the fourth embodiment will be described below.

In a fourth embodiment, the exchanger 132 comprises an eighth waveguide 342 and a ninth waveguide 352. The eighth waveguide 342 and the ninth waveguide 352 are located, for example, between the first waveguide 11 and the second waveguide 12.

The exchanger 132 comprises two first waveguide sections 21 and two second waveguide sections 22.

The eighth waveguide 342 comprises a first waveguide section 21 on the first end E1 side and a second waveguide section 22 on the fourth end E4 side. In the eighth waveguide 342, the second end E2 side of the first waveguide section 21 on the first end E1 side is connected to the third end E3 side of the second waveguide section 22 on the fourth end E4 side.

The ninth waveguide 352 comprises a first waveguide section 21 on the second end E2 side and a second waveguide section 22 on the third end E3 side. In the ninth waveguide 352, the first end E1 side of the first waveguide section 21 on the second end E2 side is connected to the fourth end E4 side of the second waveguide section 22 on the third end E3 side.

A part of the linear section connecting the second end E2 side of the first waveguide section 21 to the third end E3 side of the second waveguide section 22 in the eighth waveguide 342 and a part of the linear section connecting the first end E1 side of the first waveguide section 21 to the fourth end E4 side of the second waveguide section 22 in the ninth waveguide 352 are intersected as viewed from a direction perpendicular to the main plane of the substrate 14. Further, the intersection part of the eighth waveguide 342 and the ninth waveguide 352 as viewed from the direction perpendicular to the main surface of the substrate 14 may be vertical. The intersection part of the eighth waveguide 342 and the ninth waveguide 352 as viewed from the direction perpendicular to the main surface of the substrate 14 may intersect, or may be displaced in the direction perpendicular to the main surface of the substrate 14.

As in the first embodiment, the optical switch 102 of the fourth embodiment, configured as described above, comprises: at least one first waveguide section 21 configuring a directional coupler together with the first waveguide 11 and including a first phase change material 23; at least one second waveguide section 22 configuring a directional coupler together with the second waveguide 12 and including a second phase change material 24; and
an exchanger 132, configured: to input electromagnetic waves, input from the first end E1 and output from any of the first waveguide sections 21, to the third end E3 side of any of the second waveguide sections 22; and to input electromagnetic waves, input from the third end E3 and output from any of the second waveguide sections 22, to the second end E2 side of any of the first waveguide sections 21. Therefore, the optical switch 102 of the fourth embodiment can also reduce insertion loss while using the first phase change material 23 and the second phase change material 24. Further, in the optical switch 102 of the fourth embodiment, as in the first embodiment, the electromagnetic waves, input to at least one of the first end E1 and the third end E3, is propagated in single mode. Therefore, the optical switch 102 of the fourth embodiment can also be suitably used for optical communications because the waveform of the propagating signal is less likely to be collapsed. Further, in the optical switch 102 of the fourth embodiment, as in the first embodiment, the first waveguide 11 and the second waveguide 12 are located on the same plane. In a configuration in which the same material is applied to the first waveguide 11 and the second waveguide 12, thanks to the configuration described above, the optical switch 102 of the fourth embodiment can also be easily produced on the substrate 14 as compared to a configuration in which both are displaced in a direction perpendicular to the main plane. Further, in the optical switch 102 of the fourth embodiment, as in the first embodiment, the first phase change material 23 and the second phase change material 24 are displaced from the same plane, in which the first waveguide 11 and the second waveguide 12 are located, in a direction perpendicular to the same plane. Therefore, the optical switch 102 of the fourth embodiment can also be easily produced by the production method to form a layer for each of the same material.

Further, in the optical switch 102 of the fourth embodiment, a part of the linear section connecting the second end E2 side of the first waveguide section 21 to the third end E3 side of the second waveguide section 22 in the eighth waveguide 342, and a part of the linear section connecting the first end E1 side of the first waveguide section 21 to the fourth end E4 side of the second waveguide section 22 in the ninth waveguide 352 are vertical. With such a configuration, the optical switch 102 of the fourth embodiment can minimize that electromagnetic waves, propagating through a part of the linear section connecting the second end E2 side of the first waveguide section 21 to the third end E3 side of the second waveguide section 22, transfer to a part of the linear section connecting the fourth end E4 side of the second waveguide section 22 to the first end E1 side of the first waveguide section 21.

The present disclosure has been described with reference to the drawings and examples. It should be noted that those skilled in the art can easily make various variations and modifications based on the present disclosure. Therefore, it should be noted that these variations and modifications are included in the scope of the present disclosure.

For example, in the first through fourth embodiments, the optical switches 10, 100, 101, and 102 are configured to include a single exchanger 13, 130, 131, and 132, but a plurality of exchangers 13, 130, 131, and 132 may be provided along the y-direction.

Further, in the first embodiment, the exchanger 13 is configured to comprise two annular waveguides, a third waveguide 25 and a fourth waveguide 26. However, the same effect as that in the first embodiment can be obtained even if the exchanger 13 is formed so that an even number of annular waveguides, adjacent to each other in the x direction, configure a 2×2 directional coupler between the third waveguide 25 and the fourth waveguide 26.

Further, in the third embodiment and the fourth embodiment, the exchangers 131 and 132 comprise two first waveguide sections 21 and two second waveguide sections 22. However, the exchangers 131 and 132 may comprise three or more first waveguide sections 21 and three or more second waveguide sections 22. In the third embodiment, the sixth waveguide 301 may include the first waveguide section 21 other than the one located on most second end E2 side among the plurality of first waveguide sections 21, and the second waveguide section 22 other than the one located on most fourth end E4 side among the plurality of second waveguide sections 22. In the fourth embodiment, the eighth waveguide 342 may include the first waveguide section 21 other than the one located on most second end E2 side among the plurality of first waveguide sections 21, and the second waveguide section 22 other than the one located on most third end E3 side among the plurality of second waveguide sections 22.

REFERENCE SIGNS LIST 10, 100, 101, 102 Optical switch
11 First waveguide
12 Second waveguide
13, 130, 131, 132 Exchanger
14 Substrate
15 First end section
16 Second end section
17 First linear section
18 Third end section
19 Fourth end section
20 Second linear section
21 First waveguide section
22 Second waveguide section
23 First phase change material
24 Second phase change material
25 Third waveguide
26 Fourth waveguide
27 First section
28 Second section
290 Fifth waveguide
301 Sixth waveguide
311 Seventh waveguide
321 Third section
331 Fourth section
342 Eighth waveguide
352 Ninth waveguide
E1, E2, E3, E4 First end, Second end, Third end, Fourth end

The invention claimed is:

1. An optical switch comprising:
a first waveguide comprising a first end at a first end side of the optical switch and a second end at a second end side of the optical switch which are ports for input and output of electromagnetic waves;
a second waveguide comprising a third end and a fourth end which are ports for input and output of electromagnetic waves, wherein the third end and the fourth end are located on the first end side and the second end side, respectively, as viewed from a center of the first waveguide; and
an exchanger comprising: at least one first waveguide section, located along the first waveguide, configuring a first directional coupler together with the first waveguide, and including a first phase change material; and at least one second waveguide section, located along the second waveguide, configuring a second directional coupler together with the second waveguide, and including a second phase change material,
wherein the exchanger inputs electromagnetic waves, input from the first end and output from the at least one first waveguide section, to a third end side of the third end of the at least one second waveguide section; and the exchanger inputs electromagnetic waves, input from the third end and output from the at least one second waveguide section, to the first end side of the at least one first waveguide section,
wherein the exchanger comprises an annular third waveguide including the at least one first waveguide section and the at least one second waveguide section, and in the annular third waveguide the second end side of the at least one first waveguide section is connected to the third end side of the second waveguide section and a fourth end side of the fourth end of the second waveguide section is connected to the first end side of the first waveguide section, and wherein an annulus of the annular third waveguide has a shape in which the annulus is twisted by 180 degrees.

2. The optical switch, according to claim 1,
wherein in the annular third waveguide, a part of a linear section connecting the second end side of the first waveguide section to the third end side of the second waveguide section, and a part of a linear section connecting the fourth end side of the second waveguide section to the first end side of the first waveguide section are vertical.

3. The optical switch, according to claim 1,
wherein a laser beam is used for phase change of the phase change material.

4. The optical switch, according to claim 1,
wherein heat generation by resistive elements is used for phase change of the phase change material.

5. The optical switch, according to claim 1,
wherein electromagnetic waves, input to at least one of the first end and the third end, are propagated in single mode.

6. The optical switch, according to claim 1,
wherein the first waveguide and the second waveguide are located on a same plane.

7. The optical switch, according to claim 6,
wherein the phase change material is displaced from the plane in a direction perpendicular to the same plane.

* * * * *